April 10, 1951 T. J. STOUT 2,548,749
CHILD'S VEHICLE
Filed Sept. 30, 1948

Inventor
TWYMAN J. STOUT
By
Fishburn & Mullendore
Attorneys

Patented Apr. 10, 1951

2,548,749

UNITED STATES PATENT OFFICE 2,548,749

CHILD'S VEHICLE

Twyman J. Stout, Wichita, Kans.

Application September 30, 1948, Serial No. 52,003

4 Claims. (Cl. 280—270)

This invention relates to a child's vehicle and has for its principal object to provide a device of this character particularly adapted for use of small children and which is characterized by ease of propulsion and maneuverability.

It is also a prime object of the invention to provide a vehicle with a pair of relatively widely spaced mid wheels and swivelly mounted front and rear wheels, one of which preferably the front wheel, serving as a steering wheel.

Other objects of the invention are to provide a child's vehicle of simple, relatively light weight but strong construction; to provide the vehicle with a bumper extending around the sides and ends thereof; to provide for operation of the mid wheels to effect propulsion of the vehicle; to provide a simple steering mechanism for controlling the steering wheel; and to provide a vehicle with an elongated body stabilized laterally by the mid wheels.

In accomplishing these and other objects of the invention hereinafter pointed out, I have provided improved structure, the preferred form of which is illustrated in the accompanying drawing wherein.

Figure 1:
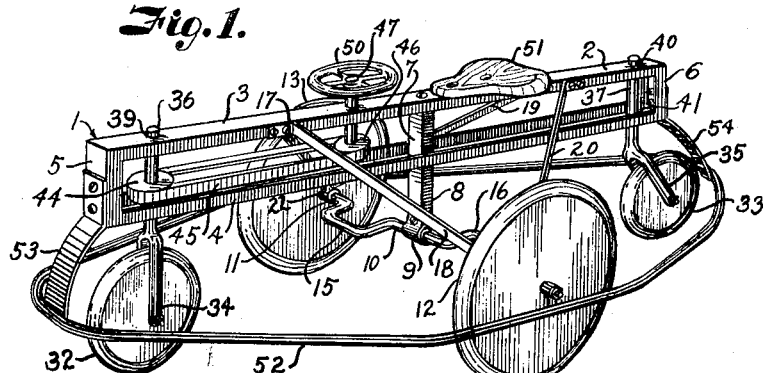
Fig. 1 is a perspective view of a child's vehicle constructed in accordance with the present invention.

Referring more in detail to the drawings:

1 designates a child's vehicle constructed in accordance with the present invention and which includes a relatively narrow and elongated frame 2 composed of upper and lower longitudinal rails 3 and 4. The rails 3 and 4 are spaced apart at the ends by vertical members 5 and 6. The mid portion of the rails are interconnected by a post 7 having a depending lower end 8 mounting a bearing 9.

Rotatably mounted in the bearing 9 is a transverse axle 10 having ends 11 and 12 projecting laterally from the sides of the frame for mounting the main or mid wheels 13 and 14. The portions of the axles between the bearing 9 and wheels are shaped to provide oppositely deposed cranks 15 and 16 that are adapted to be operated by the feet of a rider of the vehicle when seated astride of the frame.

Figure 2:
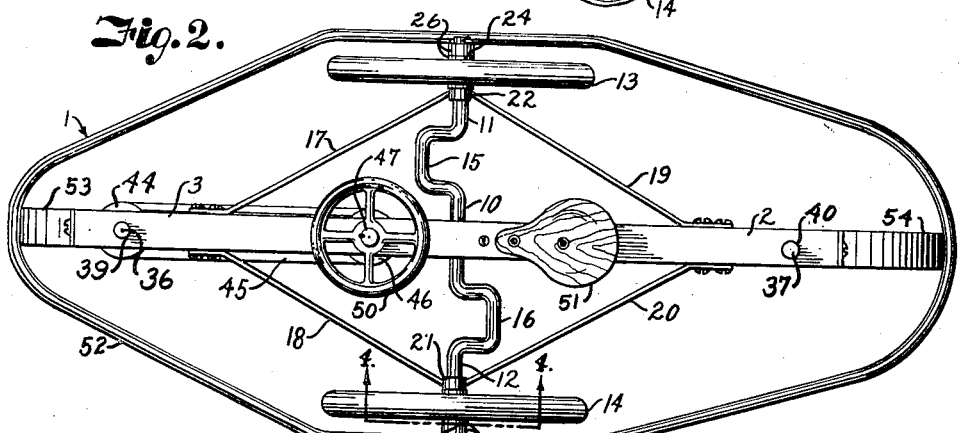
Fig. 2 is a plan view.

The frame of the vehicle is stabilized with respect to the ends of the axle by front braces 17—18 and rear braces 19—20. The braces on the respective sides of the frame are connected with the upper rail 3 forwardly and rearwardly of the post 7 and diverge outwardly and downwardly to connect with collars 21 and 22 that are loosely mounted on the axle adjacent the hubs 23 and 24 of the main wheels as best shown in Fig. 2. The wheels are retained on the axle by collars 25 and 26 which are fixed to the outer ends of the axle.

In order to provide a differential action between the respective wheels as when the vehicle is moved in a curved path and for free-wheeling when coasting, the journals for the wheels have ratchet devices 27.

The ratchet devices in the form illustrated comprise rollers 28 that are mounted in grooves 29 of the axle and which are adapted to engage the inner faces of the hubs of the respective wheels. The sides 30 of the respective grooves are substantially radial and are of a depth to freely retain the rollers out of contact with the hubs. The opposite sides 31 are inclined in the direction of rotation to cause the rollers to engage the wheel hubs.

The mid wheels are of relatively large diameter to effect substantially rapid speed of the vehicle with relative rotational speed of the cranks.

Figure 3:
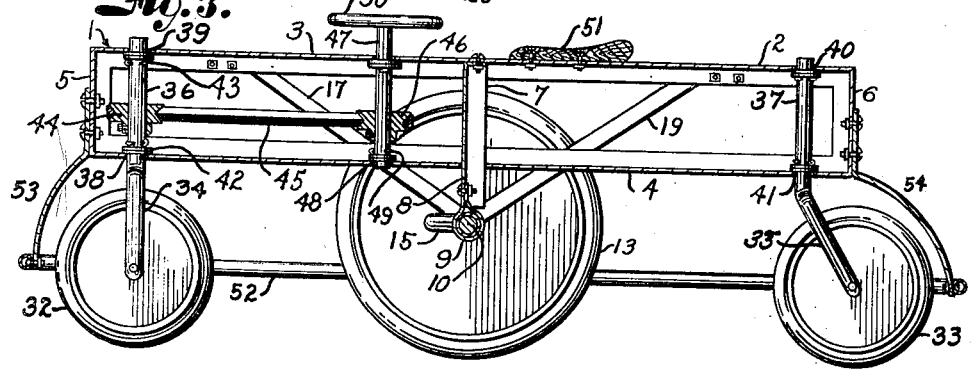
Fig. 3 is a longitudinal section through the central portion of the vehicle.
Figure 4:
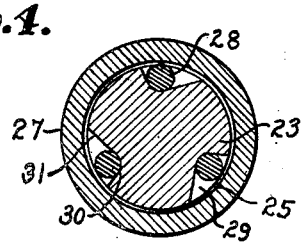
Fig. 4 is a cross section through the axle and hub of one of the mid wheels to illustrate differential or free wheel driving of the respective mid wheels.

The ends of the vehicle frame are supported on smaller wheels 32 and 33 which are journalled in forks 34 and 35 having stems 36 and 37 rotatably mounted in suitable bearing openings 38—39 and 40—41 in the rails 3 and 4 as best shown in Fig. 3. The stems are retained in fixed relation with the rails by washers 42 that are retained against the respective rails by cotter pins 43. Since the forward wheel 32 serves as a steering wheel, the fork 34 is substantially straight with respect to the stem 36 but since the rear wheel must caster to allow turning of the vehicle, the fork 35 is positioned at an angle to the stem 37 to allow rearward offset of the wheel whereby the wheel 33 trails to follow the path of the front or steering wheel.

In order to steer the wheel 32, the stem 36 thereof is provided with a grooved pulley 44 that is fixed thereon intermediate the rails 3 and 4 of the frame. Operating in the groove of the pulley is an endless belt 45 that also operates in a groove of a pulley 46 that is attached to a steering post 47 which is journalled in suitable openings in the upper and lower rails of the frame forwardly of the post 7 as shown in Fig. 3. The steering post is retained in position by washers and cotter pins 48 and 49 similar to the fork stems 34 and 35 previously described. The steering post projects above the upper rail 3 and carries a steering wheel 50 by which the operator of the vehicle may turn the post to effect steering of the front wheel through the pulley and belt connections.

The upper rail 3 of the frame may be provided with a seat 51 that is located thereon rearwardly of the post 7 which seat may be adjusted along the length of the rail.

Since the main or mid wheels extend a substantial distance beyond the sides of the frame, the vehicle is preferably provided with a bumper rail 52 that extends along the sides and around the front and rear ends of the vehicle as best shown in Figs. 1 and 2, the rail being carried by brackets 53 and 54 carried by the vertical frame members 5 and 6 respectively. In order to prevent scratching or marring of furniture, the bumper rail may be provided with a rubber or other resilient covering.

In operating the vehicle, a child straddles the frame 2 and positions himself on the seat 51 with the feet resting on the respective cranks 15 and 16, and his hands engaging the steering wheel to guide the vehicle. By pushing forwardly and downwardly on the cranks as they pass upper dead center position, power is applied to the wheels 13 and 14 to propel the vehicle in a path controlled by the steering wheel 50. When the vehicle is moved in a straight-away direction the clutch rollers 28 are wedged into clutching engagement with the hubs 23 and 24 of the wheels 13 and 14 so that power is applied equally to both of the wheels. however, when the steering wheel is turned to effect travel in a curved path the outside mid wheel moves through a greater arc than the inside wheel. Consequently, the outer wheel will overrun the axle and effect shifting of the rollers into the deeper portion of the grooves so as to permit drive solely by the inner wheel. When the vehicle turns, the caster wheel 33 pivots in the frame 2 to follow the steering wheel 32. When the vehicle again resumes a forward course the clutching rollers 28 for both wheels again become effective in applying the power equally to the mid wheels.

From the foregoing it is obvious that I have provided a child's vehicle which is of simple, light-weight construction and which is characterized by its ease of operation and maneuverability.

What I claim and desire to secure by Letters Patent is:

1. A vehicle including a longitudinal frame, an axle, means for mounting the axle transversely of a mid portion of the frame, main wheels mounted on the ends of the axle, a caster wheel pivotally supporting one end of the frame, and a steering wheel supporting the other end of the frame, said axle having foot engaging cranks projecting laterally away from opposite sides of the frame to propel said vehicle by an operator seated astride said frame.

2. A vehicle including a longitudinal frame, an axle, means for mounting the axle transversely of a mid portion of the frame, main wheels mounted on the ends of the axle, a caster wheel pivotally supporting one end of the frame, a steering wheel supporting the other end of the frame, a central bearing depending from the frame for mounting the central portion of said axle said axle having foot engaging cranks at opposite sides of the central bearing and projecting beyond sides of the frame to propel said vehicle. collar-like bearings for journalling outer ends of the axle and braces connecting the collar-like bearings with the frame.

3. A vehicle including a frame comprising upper and lower longitudinal rails, vertical members spacing front and rear ends of the rails, a post connecting mid portions of the rails and depending below the lower rail, a bearing carried by the depending end of the post, an axle rotatably mounted in the bearing, main wheels carried on ends of the axle, a caster wheel, a fork carrying the caster wheel and having a stem rotatably mounted in rear ends of the upper and lower rails, a steering wheel, a fork carrying the steering wheel and having a stem rotatably mounted in the forward ends of the upper and lower rails, a pulley fixed to said stem intermediate the rails, a steering post journalled in the upper and lower rails in front of said mid post, a pulley on the steering post, an endless belt operating over said pulleys, and an operating member carried by the steering post to effect guiding movement of the steering wheel.

4. A vehicle including a frame comprising upper and lower longitudinal rails, vertical members spacing front and rear ends of the rails, a post connecting mid portions of the rails and depending below the lower rail, a bearing carried by the depending end of the post, an axle rotatably mounted in the bearing, collars on the ends of the axle, braces connecting the upper rail with the collars, main wheels carried on the axle adjacent said collars, a caster wheel, a fork carrying the caster wheel and having a stem rotatably mounted in rear ends of the upper and lower rails, a steering wheel, a fork carrying the steering wheel and having a stem rotatably mounted in the forward ends of the upper and lower rails, a pulley fixed to said stem intermediate the rails, a steering post journalled in the upper and lower rails in front of said mid post, a pulley on the steering post, an endless belt operating over said pulleys, and an operating member carried by the steering post to effect guiding movement of the steering wheel.

TWYMAN J. STOUT.

REFERENCES CITED

The following references are of record in the file of this patent:

UNITED STATES PATENTS

| Number | Name | Date |
|---|---|---|
| 231,609 | Perkins | Aug. 24, 1880 |
| 1,371,433 | Paul | Mar. 15, 1921 |
| 1,466,201 | Strothotte | Aug. 28, 1923 |
| 1,652,284 | Madsen | Dec. 13, 1927 |
| 1,826,502 | Brown | Oct. 6, 1931 |

FOREIGN PATENTS

| Number | Country | Date |
|---|---|---|
| 11,331 | Great Britain | 1886 |
| 166,730 | Switzerland | Apr. 2, 1934 |